Figure 1:
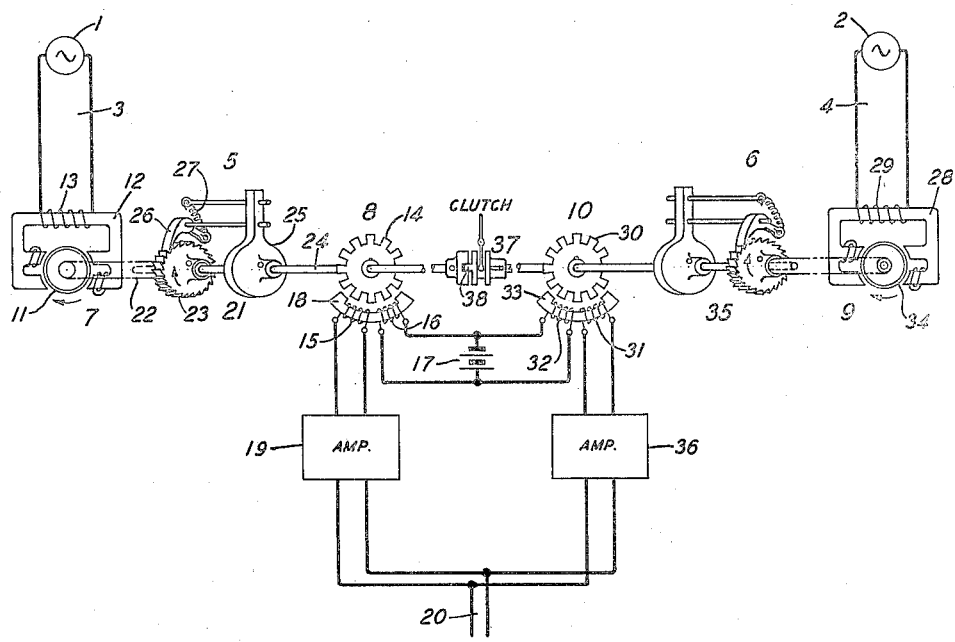

Aug. 16, 1938.                    H. A. AFFEL                    2,126,859
                               FREQUENCY CONVERTER
                              Filed Dec. 5, 1936

INVENTOR
H. A. AFFEL
BY
Wayne B Wells
ATTORNEY

Patented Aug. 16, 1938

2,126,859

UNITED STATES PATENT OFFICE 2,126,859

FREQUENCY CONVERTER

Herman A. Affel, Ridgewood, N. J., assignor to Bell Telephone Laboratories, Incorporated, New York, N. Y., a corporation of New York Application December 5, 1936, Serial No. 114,381

7 Claims. (Cl. 171—123)

This invention relates to frequency converter units and particularly to motor-generator frequency converter units for systems supplying currents of standard frequency.

One object of the invention is to provide a standard frequency system that shall maintain continuous service of a sine wave of fixed frequency and strength to a load circuit in an improved manner.

Another object of the invention is to provide a standard frequency system with two frequency converters respectively connected to different sources of the same frequency that shall supply sine waves of the same frequency and strength to a load circuit irrespective of the number of converters in operation.

Another object of the invention is to provide a standard frequency system with two motor-generator sets having a one-way driving connection between the motor and the generator of each set and a mechanical connection between the two generators to insure a fixed phase relation between the outputs from the generator whereby a sine wave of the same strength and frequency will be supplied to a load circuit whether one or both sets are connected to the load circuit.

When constant frequency currents are supplied from standard frequency sources to radio broadcasting stations and power companies it is necessary to maintain a continuous service free from any interruptions that would cause change in frequency or strength of the supplied currents. Furthermore, the frequency of the standard source will generally be much higher than that desired by the radio broadcasting station or the power company so that reliable and inexpensive frequency conversion units will be required between the source and the service stations. The frequency of the standard source which is best transmitted over a distribution network to the various customers of the service would be of the order of 4000 cycles per second. The frequency of the reference current desired by a power company would be of the order of 60 cycles per second.

According to the present invention two sources of standard frequency current are supplied to the point where conversion of the higher standard frequency current to the lower constant frequency current is desired. The two sources may be two line circuits connected to a distant standard frequency source, a line circuit and local standard frequency source or two local standard frequency sources.

The two standard frequency sources are respectively connected to two motor-generator sets. The motor in each of the motor-generator sets is preferably a self-starting alternating current motor of the type now employed in electric clocks. It is necessary that the motor be self-starting and be of a synchronous type in order to run at a speed corresponding to the frequency of the source connected to it. The motor-generator sets may be very small and, if so desired, may be mounted in an evacuated container. The motor of each motor-generator set is connected to the associated generator by a pawl and ratchet mechanism or any suitable one-way drive mechanism which will effect operation of the generator according to the so-called free wheeling. The two motor-generator sets and particularly the generators are connected together by a clutch mechanism which is provided with a tooth and slot arrangement so that the currents produced by the two generators will always have a fixed phase relation with respect to each other when joined together by the clutch mechanism. Preferably, the clutch is so arranged that when the generators of the two motor-generator sets are connected together the output currents from the generators will be 120 degrees out of phase with respect to each other. The clutch not only serves to connect the two motor-generator sets so that the output currents have a fixed phase relation but also permits mechanical separation of the two motor-generator sets so that one may be operated while the other is undergoing repairs or replacement. The output circuits from the two generators are preferably connected in parallel through amplifiers to the load circuit.

By reason of the pawl and ratchet connection between the motor and the generator of each motor-generator set, it is apparent that if anything happens to interrupt one standard frequency source the other standard frequency source will continue to operate the motor-generator set connected to it and carry the load. No change in the frequency supplied to the customer will take place if anything happens to interrupt the operation of one source or one motor-generator set. When the motor connected to one generator has been interrupted for any cause, it is apparent that when the source is restored or the motor is repaired this motor will take up its share of the load when its speed is restored. The two generators are mechanically connected so that the output currents are 120 degrees out of phase in order to insure that the current suplied to the customer is a sine wave of constant frequency and strength irrespective as to whether one or both of the two generators are in service. The clutch between the two motor-generator sets permits as above set forth the separating of the two motor-generator sets when desired. Thus one motor-generator set may be taken out of service for repair purposes at any time. The rotors of the motor-generator sets should be built with sufficient inertia so as to have a flywheel effect. If necessary a separate flywheel may be provided to supply sufficient inertia.

Figure 2:
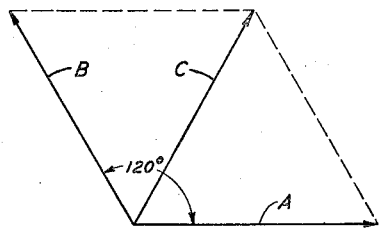

In the accompanying drawing Fig. 1 is a diagrammatic view of a frequency converter arrangement constructed in accordance with the invention; and Fig. 2 is a vector diagram showing the relation of the voltage outputs from the two generators of Fig. 1.

Referring to Fig. 1 of the drawing, two standard frequency sources 1 and 2 are respectively connected by line circuits 3 and 4 to two motor-generator sets 5 and 6. The motor-generator set 5 comprises a motor 7 and a generator 8. The motor-generator set 6 comprises a motor 9 and a generator 10.

The motor 7 which is of the synchronous alternating current type comprises a rotor 11 and a stator 12 having a winding 13 connected by the line 3 to the source 1. The motor 7 and the motor 9 may be of the type employed for operating electric clocks. The generator 8 comprises a toothed rotor 14, an armature winding 15 and a field winding 16. The field winding 16 is energized from a suitable direct current source as, for example, the battery 17. If so desired, the winding 16 and the battery 17 may be replaced by a permanent magnet. In such case the core member 18 would serve as a permanent magnet. The armature winding 15 is connected through a suitable amplifier 19 to the load conductors 20.

The rotor 11 of the motor 7 and the rotor 14 of the generator 8 are connected together by a pawl and ratchet mechanism 21 so that the generator rotor 14 can be driven by the motor 7 in one direction only. It is to be understood that the pawl and ratchet mechanism 21 is shown for descriptive purposes only and that any other one-way driving connection may be provided between the motor rotor and the generator rotor. A shaft 22 which carries the rotor 11 of the motor 7 also carries a ratchet wheel 23 fixedly mounted thereon. A shaft 24 which carries the rotor 14 of the generator 8 carries a supporting bracket 25 which, in turn, movably supports a pawl 26. The pawl 26 is held in engagement with the ratchet wheel 23 by means of a spring member 27. By reason of the action of the pawl 26 and the ratchet 23, it is apparent that the motor 7 can only drive the generator rotor 14 in a clockwise direction. As will be apparent later in the description the generator 8 will be driven by the motor 9 if at any time the speed of the motor 7 falls below the speed of the motor 9.

The motor 9 of the motor-generator set 6 comprises a stator 28 having a winding 29 connected by the line 4 to the source 2 and a rotor 34. The generator 10 comprises a toothed rotor 30 and a stator having an armature winding 31 and a field winding 32. The field winding 32 may be connected to the source 17. If desired, the winding 32 may be dispensed with and the core 33 made in the form of a permanent magnet. The rotor 34 of the motor 9 and the rotor 30 of the generator 10 are connected together by a pawl and ratchet mechanism 35 which is similar in construction and operation to the pawl and ratchet mechanism 21 in the motor-generator set 5. The armature winding 31 of the generator 10 is connected through a suitable amplifier 36 to the load circuit 20.

The shaft carrying the rotor 14 of the generator 8 and the shaft carrying the rotor 30 of the generator 10 are joined together by a clutch 37. The clutch consists of a suitable key and slot 38 so that the two generators 8 and 10 can only be mechanically connected together in a fixed phase relation. The two rotors should be connected together so that the output voltages from the two generators are 120 degrees out of phase with respect to each other.

If the vector A in Fig. 2 of the drawing represents the voltage output from the generator 8 and the vector B which is 120 degrees out of phase from the vector A represents the voltage output from the generator 10, then the vector C will represent the voltage supplied to the load circuit if the output circuits from the two generators are connected in parallel to the load circuit. The vector C is equal in absolute magnitude to either the vectors A or B. The output supplied to the load circuit 20 will be a sine wave having a constant frequency and strength irrespective as to whether one or both of the two generators 8 and 10 are in service.

In the above-described frequency converter arrangement it is apparent that if both motor-generator sets 5 and 6 are operating simultaneously from the sources 1 and 2 and one of the sources, for example, 1 fails, the whole motor-generator system will continue to be driven with no change in speed by the motor 9 connected to the source 2. If the source 1 is restored again and motor 7 comes up to speed, this motor will take on its share of the load without any serious disturbance in the frequency or phase output supplied to the load circuit 20. If for any reason the two sources 1 and 2 should differ in frequency, the resultant frequency supplied to the load will be that derived from the higher frequency of the two sources.

Modifications in the circuit and arrangement of parts may be made within the spirit and scope of the invention and such modifications are intended to be covered by the appended claims.

What is claimed is:

1. In a standard frequency distribution system, two sources each producing the same standard frequency voltage, two similar motor-generator sets respectively operated by said two sources, clutch means for mechanically connecting said generators to insure the voltages from the two generators being 120 degrees out of phase with respect to each other so that the two output voltages may be combined to form a sine wave of the frequency and strength as that produced by either of said generators.

2. In a standard frequency distribution system, two sources each having the same standard frequency, two similar motor-generator sets respectively operated from said two sources, means for connecting the motor rotor to the generator rotor of each set to insure driving the generator rotor in only one direction, clutch means for connecting the generators of said sets to insure that the voltages from the generators have a different but fixed phase relation, and means for connecting the generators to a load circuit to insure voltage of one frequency and the same strength being supplied to the load irrespective of the number of generators in operation.

3. In a standard frequency distribution system, two sources having the same standard frequency, two similar motor-generator sets respectively operated from said two sources, mechanism for connecting the motor rotor to the generator rotor of each motor-generator set to insure driving the generator rotor in only one direction, clutch means for connecting the two generators together to insure that the voltage outputs are 120 degrees out of phase, and a load circuit connected to said generators and supplied with a sine wave of the same strength and frequency as that produced by either of said generators.

4. In a standard frequency distribution system, two sources each having the same standard frequency, two similar motor-generator sets respectively operated by said two sources, means comprising a ratchet mechanism for connecting the motor rotor to the generator rotor in each motor-generator set to insure driving the generator rotor in only one direction, clutch mechanism for mechanically connecting the generator rotors of the two sets to insure that the voltage outputs from the generators have a fixed phase relation, and a load circuit connected to the two generators so that a sine wave of one frequency and the same strength is supplied to the load when one or both generators are in operation.

5. In a standard frequency distribution system, two sources having the same standard frequency, two similar motor-generator sets respectively operated from said two sources, amplifying means for connecting said generators to one load circuit, means for connecting the motor rotor to the generator rotor in each set to insure the driving of the generator rotor by the associated motor rotor in only one direction, and clutch means for connecting the two motor-generator sets to insure that the generator outputs are out of phase an amount to insure a sine wave of the same frequency and strength as either of said generators being supplied to a load circuit.

6. In a standard frequency distribution system, two sources of standard frequency current, two similar synchronous motors respectively operated from said two sources, a generator connected to a load circuit, and means comprising two one-way driving connections respectively connecting said motors to the generator.

7. In a standard frequency distribution system, two sources of standard frequency current, two similar motor-generator sets respectively operated from said two sources, means for connecting the generators of said motor-generator sets electrically in parallel circuit relation, means comprising a mechanical connection between the two generators of said sets to obtain a sine wave of the same strength and frequency irrespective of the number of generators in operation, and means comprising a one-way mechanical driving connection for joining the motor rotor to the generator rotor in each motor-generator set to insure driving the generator rotor in only one direction.

HERMAN A. AFFEL.